US011934636B2

(12) United States Patent
Chand

(10) Patent No.: US 11,934,636 B2
(45) Date of Patent: *Mar. 19, 2024

(54) VOICE DRIVEN DYNAMIC MENUS

(71) Applicant: Snap Inc., Santa Monica, CA (US)

(72) Inventor: Jesse Chand, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,530

(22) Filed: Mar. 27, 2023

(65) Prior Publication Data

US 2023/0229290 A1 Jul. 20, 2023

Related U.S. Application Data

(63) Continuation of application No. 16/949,208, filed on Oct. 20, 2020, now Pat. No. 11,640,227, which is a (Continued)

(51) Int. Cl.
*G06F 3/0482* (2013.01)
*G06F 3/04817* (2022.01)
(Continued)

(52) U.S. Cl.
CPC ............ *G06F 3/0482* (2013.01); *G06F 3/167* (2013.01); *G11B 27/031* (2013.01); *G11B 27/34* (2013.01);
(Continued)

(58) Field of Classification Search
CPC ..... G06F 3/0482; G06F 3/167; G11B 27/031; G11B 27/34
See application file for complete search history.

(56) References Cited

U.S. PATENT DOCUMENTS 5,226,090 A   7/1993  Kimura
5,557,320 A   9/1996  Krebs
(Continued)

FOREIGN PATENT DOCUMENTS

CN   102592607 A   7/2012
CN   110709807 A   1/2020
(Continued)

OTHER PUBLICATIONS

"U.S. Appl. No. 15/805,984, Final Office Action dated Aug. 22, 2019", 24 pgs.
(Continued)

*Primary Examiner* — William L Bashore
*Assistant Examiner* — Nathan K Shrewsbury
(74) *Attorney, Agent, or Firm* — SCHWEGMAN LUNDBERG & WOESSNER, P.A.

(57) ABSTRACT

Disclosed are systems, methods, and computer-readable storage media to provide voice driven dynamic menus. One aspect disclosed is a method including receiving, by an electronic device, video data and audio data, displaying, by the electronic device, a video window, determining, by the electronic device, whether the audio data includes a voice signal, displaying, by the electronic device, a first menu in the video window in response to the audio data including a voice signal, displaying, by the electronic device, a second menu in the video window in response to a voice signal being absent from the audio data, receiving, by the electronic device, input from the displayed menu, and writing, by the electronic device, to an output device based on the received input.

20 Claims, 13 Drawing Sheets

Related U.S. Application Data continuation of application No. 15/805,984, filed on Nov. 7, 2017, now Pat. No. 10,845,956.

(60) Provisional application No. 62/513,269, filed on May 31, 2017.

(51) Int. Cl.

| | | |
|---|---|---|
| *G06F 3/16* | (2006.01) | |
| *G10L 21/003* | (2013.01) | |
| *G10L 21/02* | (2013.01) | |
| *G10L 21/0316* | (2013.01) | |
| *G10L 25/78* | (2013.01) | |
| *G11B 27/031* | (2006.01) | |
| *G11B 27/34* | (2006.01) | |

(52) U.S. Cl.
CPC .......... *G06F 3/04817* (2013.01); *G06F 3/165* (2013.01); *G06F 2203/04803* (2013.01); *G10L 21/003* (2013.01); *G10L 21/02* (2013.01); *G10L 21/0316* (2013.01); *G10L 25/78* (2013.01)

(56) References Cited

U.S. PATENT DOCUMENTS

| | | | |
|---|---|---|---|
| 5,613,056 A * | 3/1997 | Gasper | G11B 27/10 |
| | | | 704/E21.02 |
| 5,649,060 A | 7/1997 | Ellozy et al. | |
| 5,692,104 A | 11/1997 | Chow et al. | |
| 5,794,249 A | 8/1998 | Orsolini et al. | |
| 5,818,512 A | 10/1998 | Fuller | |
| 5,822,024 A | 10/1998 | Setogawa et al. | |
| 5,828,809 A | 10/1998 | Chang et al. | |
| 5,835,667 A | 11/1998 | Wactlar et al. | |
| 5,889,223 A | 3/1999 | Matsumoto | |
| 5,903,892 A | 5/1999 | Hoffert et al. | |
| 5,982,979 A | 11/1999 | Omata et al. | |
| 6,014,183 A | 1/2000 | Hoang | |
| 6,360,234 B2 | 3/2002 | Jain et al. | |
| 6,370,543 B2 | 4/2002 | Hoffert et al. | |
| 6,463,444 B1 | 10/2002 | Jain et al. | |
| 6,567,980 B1 | 5/2003 | Jain et al. | |
| 6,724,862 B1 * | 4/2004 | Shaffer | H04M 1/6016 |
| | | | 381/314 |
| 7,028,265 B2 | 4/2006 | Kuromusha et al. | |
| 7,292,986 B1 | 11/2007 | Venolia et al. | |
| 7,295,752 B1 | 11/2007 | Jain et al. | |
| 7,668,721 B2 | 2/2010 | Barkley et al. | |
| 7,996,538 B2 | 8/2011 | Kikkawa et al. | |
| 8,271,287 B1 | 9/2012 | Kermani | |
| 8,296,315 B2 | 10/2012 | Tedesco et al. | |
| 8,591,332 B1 | 11/2013 | Bright et al. | |
| 8,745,500 B1 | 6/2014 | Kostello et al. | |
| 8,818,175 B2 | 8/2014 | Dubin et al. | |
| 8,938,393 B2 | 1/2015 | Gunatilake et al. | |
| 9,178,957 B2 | 11/2015 | Pegg | |
| 9,256,396 B2 | 2/2016 | Monson et al. | |
| 9,305,155 B1 | 4/2016 | Vo et al. | |
| 9,639,251 B2 * | 5/2017 | Lee | G06F 16/685 |
| 10,373,648 B2 | 8/2019 | Sun et al. | |
| 10,845,956 B2 | 11/2020 | Chand | |
| 11,640,227 B2 | 5/2023 | Chand | |
| 2001/0024447 A1 | 9/2001 | Yoshio et al. | |
| 2002/0044226 A1 | 4/2002 | Risi | |
| 2002/0107695 A1 | 8/2002 | Roth et al. | |
| 2003/0046071 A1 | 3/2003 | Wyman | |
| 2004/0133421 A1 | 7/2004 | Burnett et al. | |
| 2005/0198006 A1 | 9/2005 | Boicey et al. | |
| 2007/0118910 A1 | 5/2007 | Taylor | |
| 2008/0214168 A1 * | 9/2008 | Bailey | H04M 1/72439 |
| | | | 455/415 |
| 2008/0247726 A1 | 10/2008 | Lee et al. | |
| 2009/0002479 A1 | 1/2009 | Sangberg et al. | |
| 2009/0288011 A1 | 11/2009 | Piran et al. | |
| 2010/0246571 A1 | 9/2010 | Geppert et al. | |
| 2010/0305732 A1 * | 12/2010 | Serletic | G10H 7/00 |
| | | | 715/727 |
| 2011/0293018 A1 | 12/2011 | Deever | |
| 2012/0289122 A1 | 11/2012 | Elliott | |
| 2013/0006625 A1 | 1/2013 | Gunatilake et al. | |
| 2013/0141516 A1 | 6/2013 | Baldwin | |
| 2014/0152758 A1 | 6/2014 | Tong et al. | |
| 2014/0229831 A1 | 8/2014 | Chordia et al. | |
| 2014/0282000 A1 | 9/2014 | Almaghlouth | |
| 2014/0379342 A1 | 12/2014 | Li et al. | |
| 2015/0104155 A1 | 4/2015 | Bloch et al. | |
| 2015/0113407 A1 | 4/2015 | Hoffert et al. | |
| 2015/0156592 A1 | 6/2015 | Jensen | |
| 2015/0172599 A1 | 6/2015 | Caldwell | |
| 2016/0019026 A1 * | 1/2016 | Gupta | G06F 3/165 |
| | | | 704/233 |
| 2016/0133257 A1 | 5/2016 | Namgoong et al. | |
| 2016/0191958 A1 | 6/2016 | Nauseef et al. | |
| 2016/0211001 A1 | 7/2016 | Sun et al. | |
| 2017/0111614 A1 * | 4/2017 | Tong | H04N 7/147 |
| 2017/0111702 A1 | 4/2017 | Jordan et al. | |
| 2017/0125057 A1 | 5/2017 | Chordia et al. | |
| 2017/0206913 A1 | 7/2017 | Nahman et al. | |
| 2018/0005630 A1 | 1/2018 | May et al. | |
| 2018/0136612 A1 | 5/2018 | Zayets-volshin et al. | |
| 2018/0286462 A1 | 10/2018 | Becherer et al. | |
| 2018/0348970 A1 | 12/2018 | Chand | |
| 2019/0020853 A1 | 1/2019 | Segal | |
| 2021/0034202 A1 | 2/2021 | Chand | |

FOREIGN PATENT DOCUMENTS

| | | |
|---|---|---|
| CN | 110709807 B | 9/2023 |
| EP | 1315362 A2 | 5/2003 |
| EP | 1970824 A1 | 9/2008 |
| EP | 3631798 B1 | 6/2022 |
| KR | 102338752 B1 | 12/2021 |
| KR | 102373199 B1 | 3/2022 |
| WO | WO-2018222686 A1 | 12/2018 |

OTHER PUBLICATIONS

"U.S. Appl. No. 15/805,984, Non Final Office Action dated Mar. 15, 2019", 30 pgs.

"U.S. Appl. No. 15/805,984, Non Final Office Action dated Apr. 24, 2020", 32 pgs.

"U.S. Appl. No. 15/805,984, Notice of Allowance dated Jul. 23, 2020", 9 pgs.

"U.S. Appl. No. 15/805,984, Response filed May 20, 2019 to Non Final Office Action dated Mar. 15, 2019", 9 pgs.

"U.S. Appl. No. 15/805,984, Response filed Jun. 23, 2020 to Non Final Office Action dated Apr. 24, 2020", 9 pgs.

"U.S. Appl. No. 15/805,984, Response filed Nov. 18, 2019 to Final Office Action dated Aug. 22, 2019", 10 pgs.

"U.S. Appl. No. 16/949,208 Response filed Sep. 1, 2022 to Non Final Office Action dated Jun. 2, 2022", 10 pgs.

"U.S. Appl. No. 16/949,208, Corrected Notice of Allowability dated Jan. 13, 2023", 2 pgs.

"U.S. Appl. No. 16/949,208, Non Final Office Action dated Jun. 2, 2022", 25 pgs.

"U.S. Appl. No. 16/949,208, Notice of Allowance dated Dec. 29, 2022", 9 pgs.

"Chinese Application Serial No. 201880036154.2, Office Action dated Dec. 2, 2022", w/ English translation, 13 pgs.

"Chinese Application Serial No. 201880036154.2, Voluntary Amendment Filed Apr. 16, 2020", w/ English Claims, 9 pgs.

"European Application Serial No. 18735008.7, Response to Communication Pursuant to Rules 161(1) and 162 EPC dated Jun. 17, 2020", 19 pgs.

"European Application Serial No. 22174435.2, Extended European Search Report dated Sep. 6, 2022", 8 pgs.

"International Application Serial No. PCT/US2018/035083, International Preliminary Report on Patentability dated Dec. 12, 2019", 9 pgs.

(56) References Cited

OTHER PUBLICATIONS

"International Application Serial No. PCT/US2018/035083, International Search Report dated Sep. 6, 2018", 4 pgs.
"International Application Serial No. PCT/US2018/035083, Written Opinion dated Sep. 6, 2018", 7 pgs.
"Korean Application Serial No. 10-2019-7038382, Office Action dated Mar. 24, 2021", w/ English Translation, 9 pgs.
"Korean Application Serial No. 10-2019-7038382, Response filed May 24, 2021 to Office Action dated Mar. 24, 2021", w/ English Claims, 28 pgs.
"European Application Serial No. 23194700.3, Extended European Search Report dated Sep. 26, 2023", 8 pgs.

\* cited by examiner

VOICE DRIVEN DYNAMIC MENUS

CROSS-REFERENCE TO RELATED APPLICATIONS

This application is a continuation of U.S. patent application Ser. No. 16/949,208, filed on Oct. 20, 2020, which is a continuation of U.S. patent application Ser. No. 15/805,984, filed on Nov. 7, 2017, and issued as U.S. Pat. No. 10,845,956, which claims the benefit of priority to U.S. Provisional Application Ser. No. 62/513,269, filed on May 31, 2017, each of which are incorporated herein by reference in their entireties.

TECHNICAL FIELD

The present disclosure generally relates to the technical field of user interface menuing systems. In some aspects, menus that control voice filtering on mobile devices are disclosed.

BACKGROUND

As the popularity of social networking grows, the number of digital images and videos generated and shared using social networks grows as well. These images and videos are frequently shared with friends or other associates to both inform and/or entertain. A social network's ability to facilitate these purposes can have a substantial effect on the adoption and continued use of the social network. Therefore, additional methods of facilitating communication between social network members are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that dynamically analyze an audio portion of a video to determine whether a voice signal is present in an audio track of the video. If a voice signal is present, a first menu may be presented. If a voice signal is not present in the audio portion of the video, a second menu may be presented. The first menu may include options for modifying the audio track of the video. For example, a first menu option may increase a frequency of the audio track. A second menu option may lower a frequency of the audio track. The modified audio track may be stored with the video track.

Figure 1:
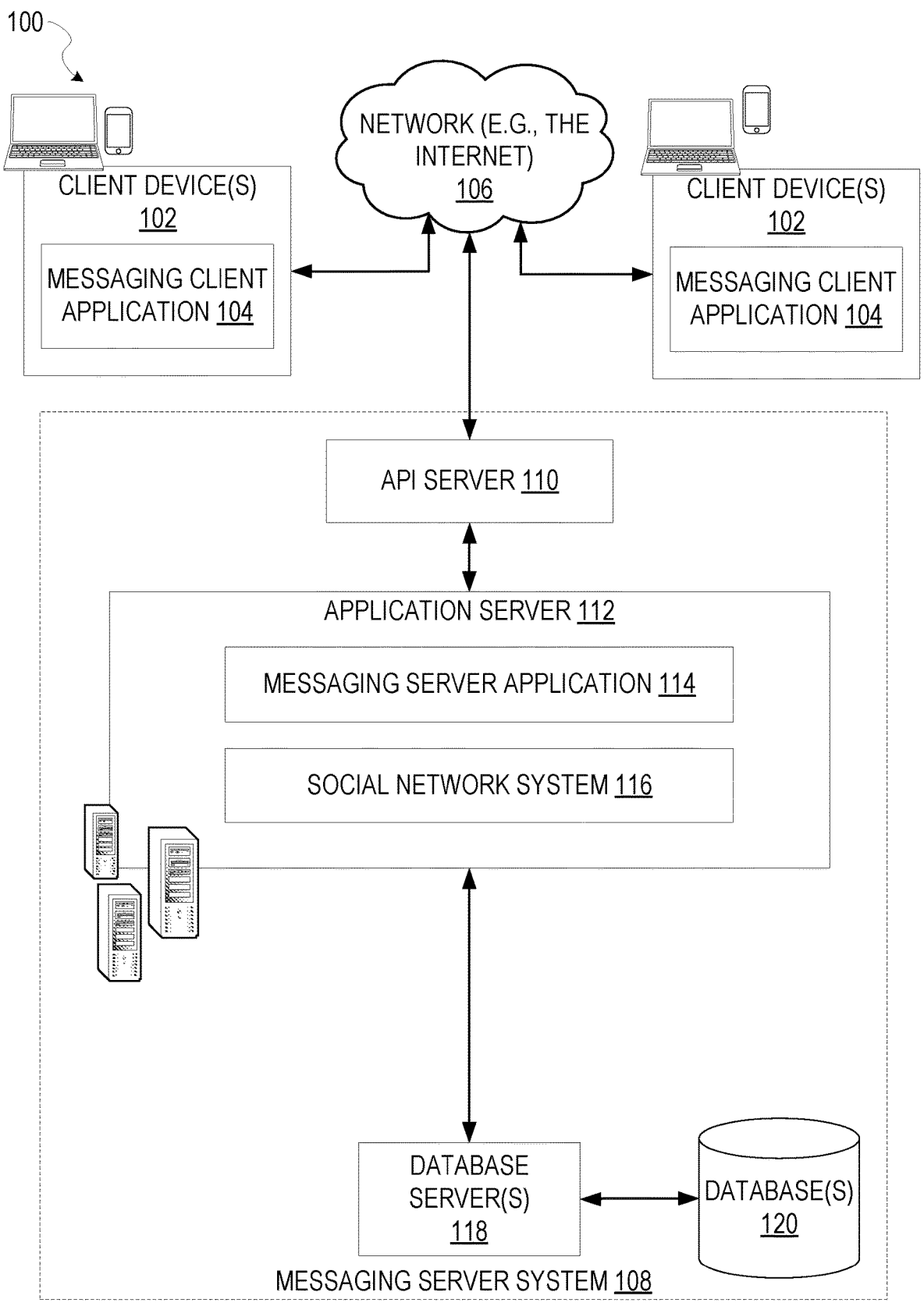
FIG. 1 is a block diagram showing an example messaging system for exchanging data (e.g., messages and associated content) over a network, according to some embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
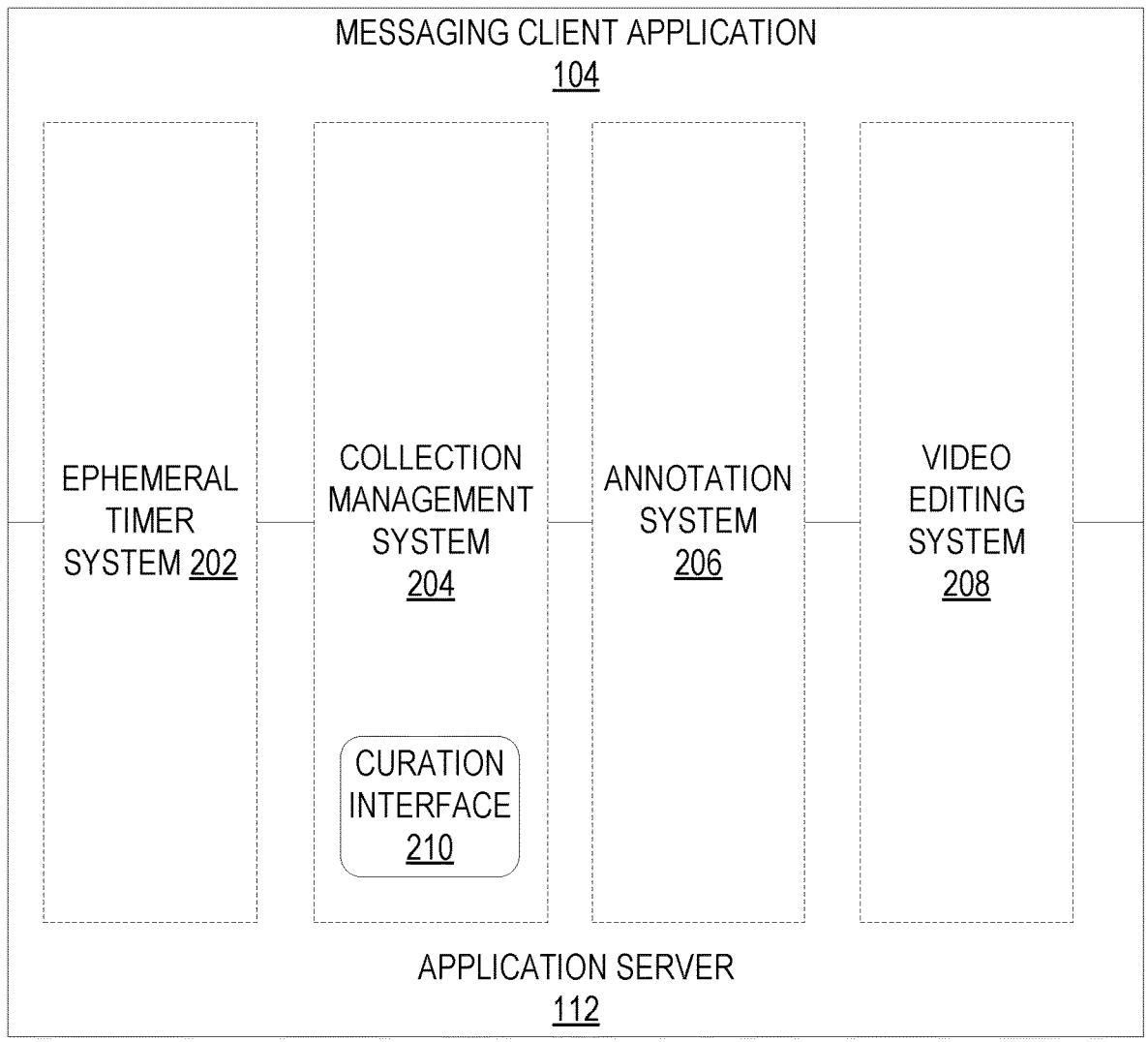
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and video editing system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content in a collection. In such cases, the curation interface 210 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The video editing system 208 is dedicated to performing video editing operations, in some instances, with respect to images or video received within the payload of a message at the messaging server application 114. As an example, the video editing system 208 provides functionality to allow a user to modify an audio track of a video, and in particular, to modify a voice signal within the audio track of the video. Further details regarding the video editing system 208 are discussed below in reference to FIG. 4.

Figure 3:
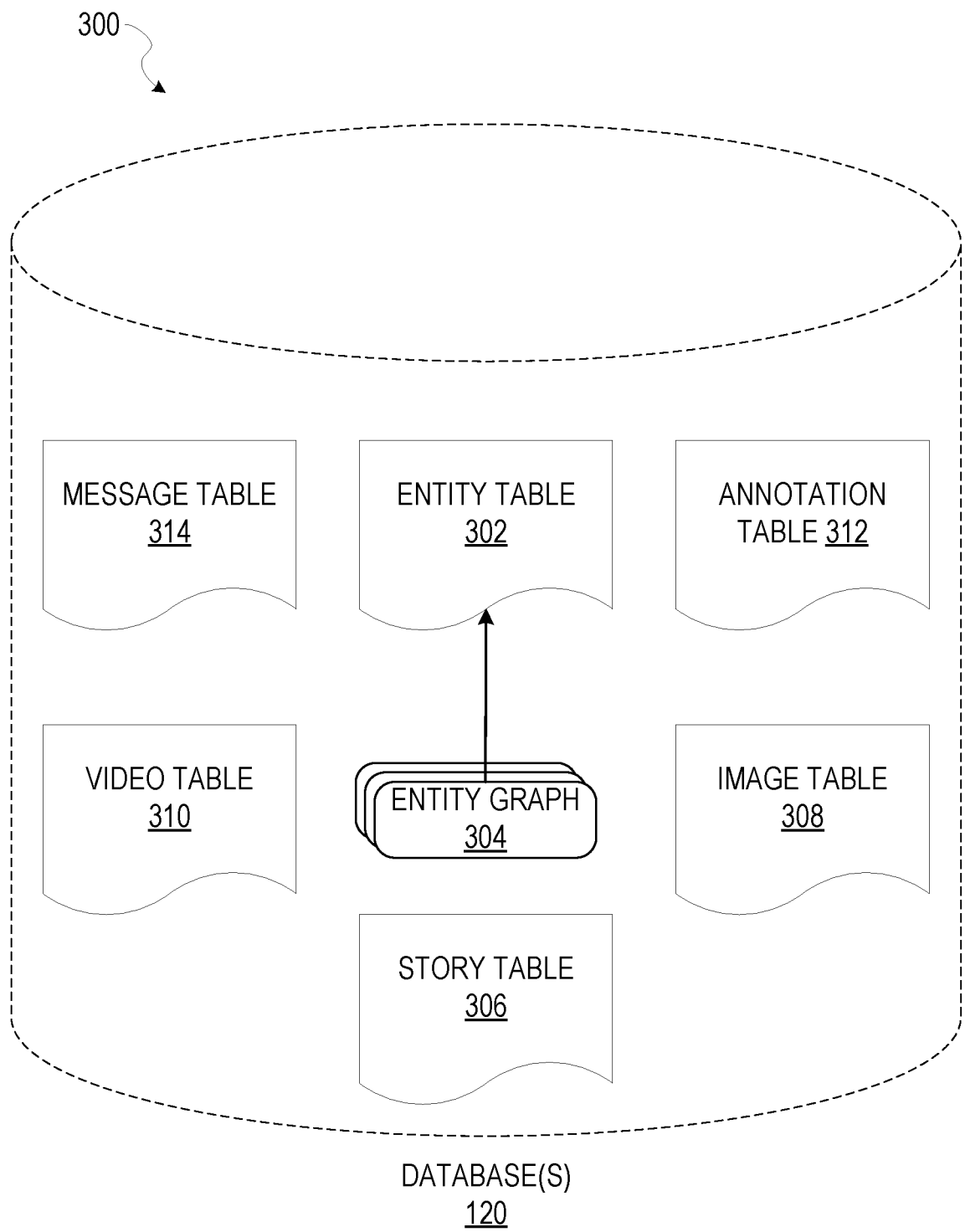
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
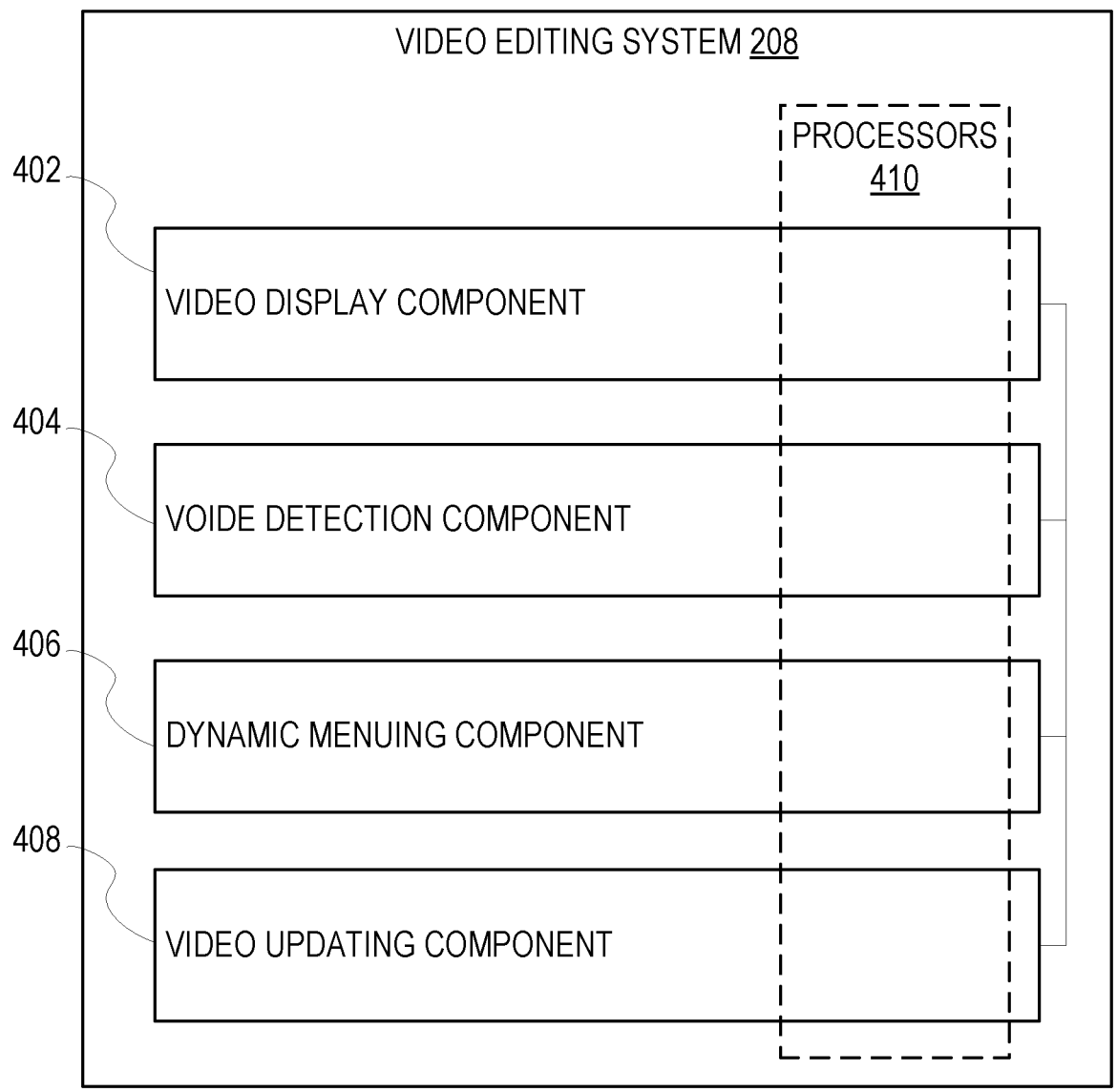
FIG. 4 is a block diagram illustrating functional components of a video editing system that forms part of the messaging system, according to some example embodiments.

FIG. 4 is a block diagram illustrating functional components of the video editing system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the video editing system 208 to facilitate additional functionality that is not specifically described herein. As shown, the video editing system 208 includes a video display component 402, a voice detection component 404, a dynamic menuing component 406, and a video updating component 408.

The above referenced functional components of the video editing system 208 are configured to communicate with each other (e.g., via a bus, shared memory, a switch, or APIs). Collectively, these components facilitate voice driven dynamic menus for a video editor. In other words, the video display component 402, a voice detection component 404, a dynamic menuing component 406, and a video updating component 408 work in conjunction to allow a user to easily modify a voice included in an audio track of the video, by adding one or more special effects to the voice signal, and or changing the voice signal in one or more different manners.

The video display component 402 is responsible for displaying a user generated video on a display screen of the client messaging application 104. A video displayed by the video display component 402 may include a video track and an audio track. The video display component 402 may display the video track and may, in some aspects, generate an audio signal based on the audio track of the video. The video display component may provide for selective playback of the video track and/or audio track. For example, the video display component may provide for selection of a particular portion of the video for playback. The video display component may also include fast forward and rewind capabilities for the video.

The voice detection component 404 may analyze the audio track of the video displayed by the video display component 402. The voice detection component 404 may apply one or more techniques to determine whether a portion of the audio track includes a voice signal or does not include a voice signal. In various aspects, the voice detection component 404 may perform noise reduction on the portion of the audio track, calculate features or quantities from the noise reduced portion, and classify the portion based on the features or quantities with respect to whether or not the portion includes a voice signal.

The dynamic menuing component 406 may determine one or more menus for display by the video display component 402. The dynamic menuing system 406 may receive a signal from the voice detection component 404, indicating whether the audio track of the video includes a voice signal or does not include a voice signal. The dynamic menuing component 406 may then determine a content of a menu based on the received signal. For example, if a voice signal is present in the video, a first set of menu options may be generated for display by the video display component 402. If a voice signal is not present in the video, a second set of menu options may be generated for display by the video display component 402.

The video updating component 408 may generate new video data based on selections made via a menu presented by the dynamic menuing component. For example, if a user of the video editing system selects application of a particular voice effect to the audio track of the video displayed by the video display component 402 from a menu presented by the dynamic menuing component 406, the video updating component 408 may generate a second audio track by applying the selected effect to the existing audio track of the video. A new video file may then be written to a stable storage or network by the video updating component 408, with the new video file including the video track and the second audio track.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the video editing system 208 may physically include an arrangement of one or more processors 410 (e.g., a subset of or among one or more processors of a machine) configured to perform the operations described herein for that component. As another example, any component of the video editing system 208 may include software, hardware, or both, that configure an arrangement of the one or more processors 410 to perform the operations described herein for that component. Accordingly, different components of the video editing system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-9.

Figure 5:
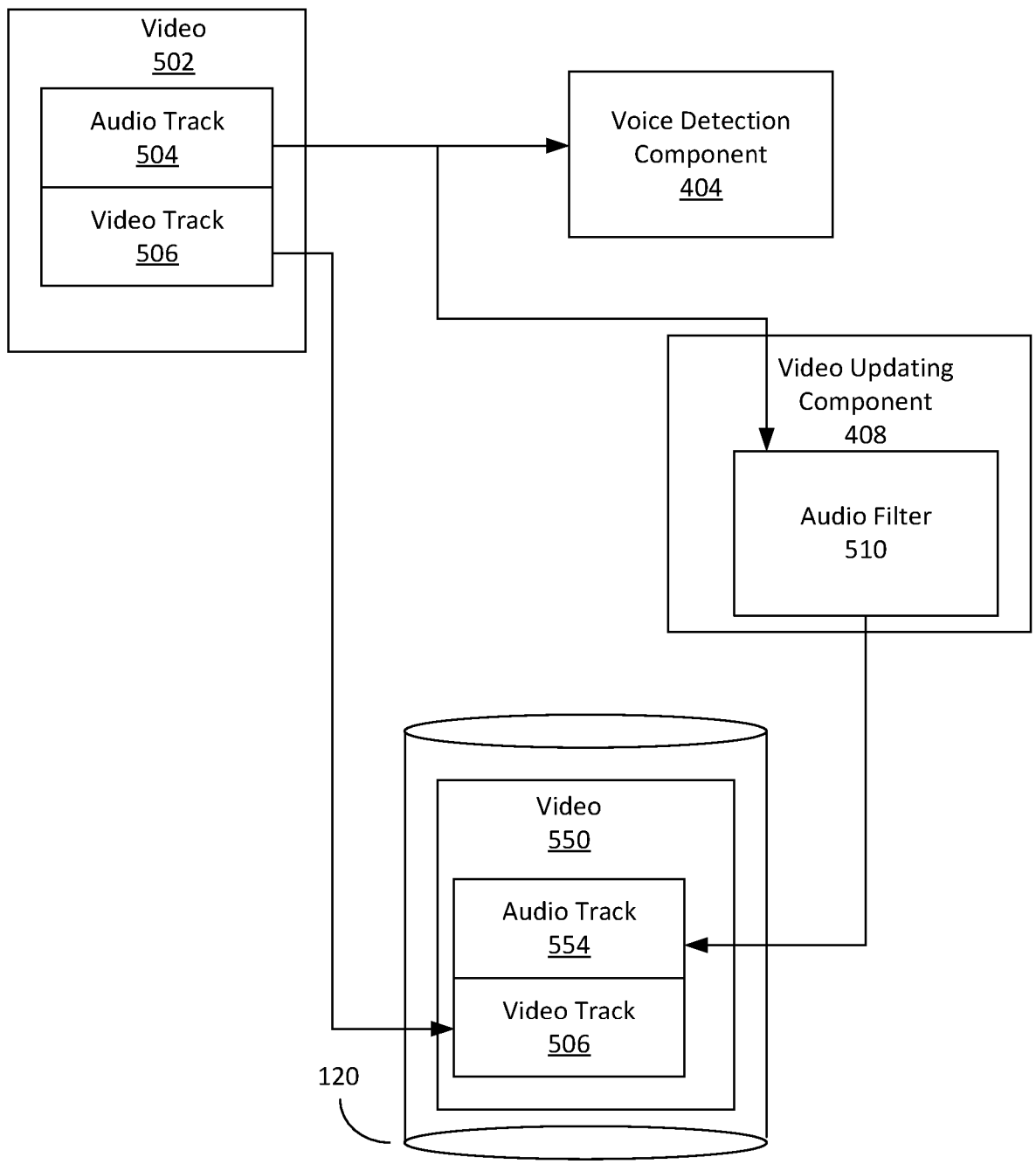
FIG. 5 is a data flow diagram of at least one exemplary embodiment.

FIG. 5 is an exemplary data flow diagram for the methods and systems disclosed herein. FIG. 5 illustrates a video 502, which may include at least an audio track 504 and a video track 506. The audio track 504 may be provided to the voice detection component 404 and/or an audio filter 510. The voice detection component 404 may detect whether there is a voice signal present in the audio track 504. This information may be used to provide dynamic menus, discussed in more detail below. Depending on a selection of the dynamic menus, the audio track 504 may also be provided to an audio filter 510. In some aspect, the audio filter 510 may be included in the video updating component 408. The audio filter 510 may apply one or more effects to the audio track 504. An output of the audio filter 510 may be stored as part of a video 550 which is stored in the database 120. Alternatively, the video 550 may be stored as a separate file, such as a file conforming to any one of the MPEG file formats. The video track 506 may be included in the video 550 or stored in the separate file as discussed above. While FIG. 5 shows the video updating component 408 writing data to a new video 550 from the video 502, in some aspects, the video 502 may itself be modified by the video updating component 408.

Figure 6:
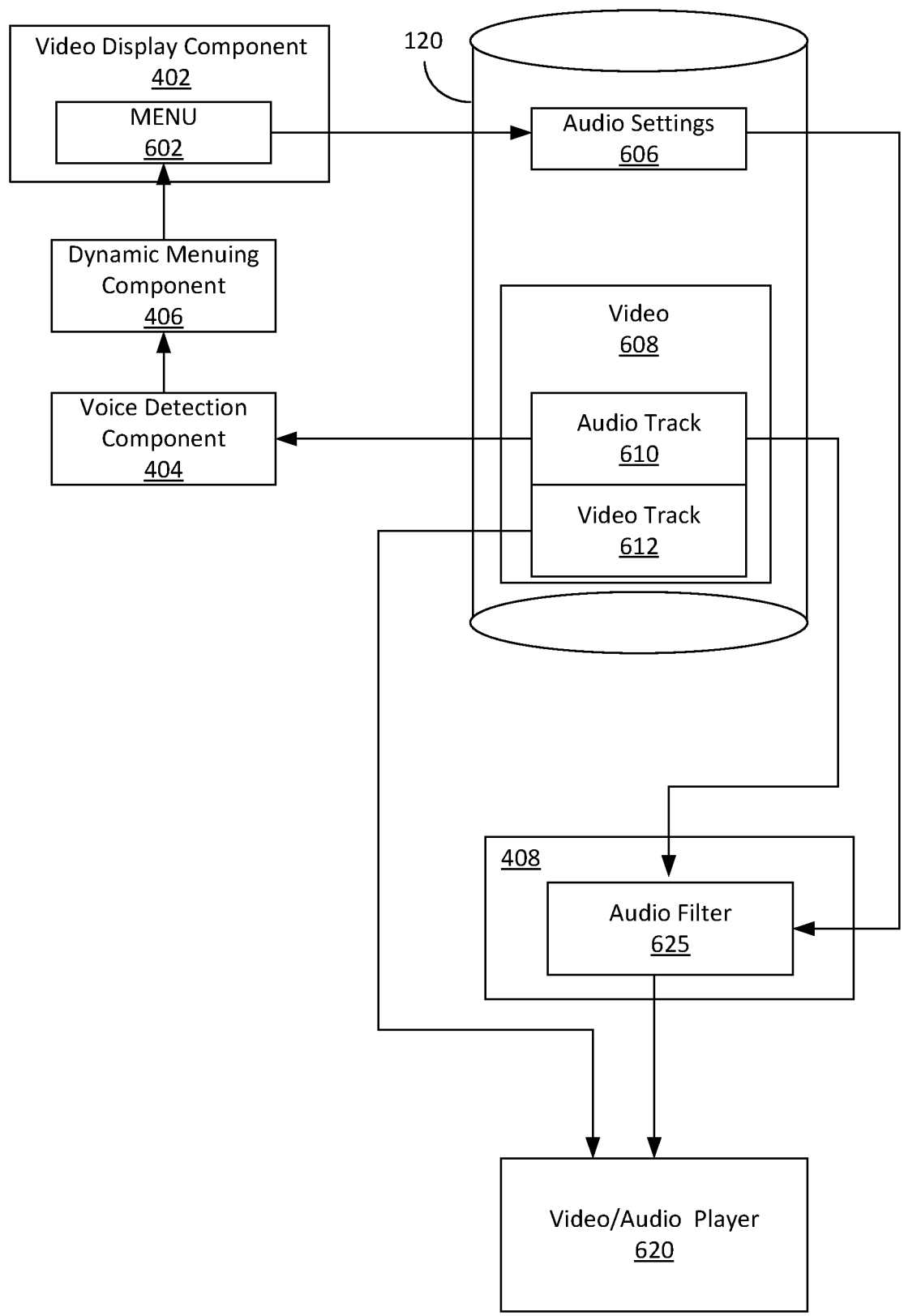
FIG. 6 is a data flow diagram of at least one exemplary embodiment.

FIG. 6 is another exemplary data flow diagram for the disclosed methods and systems. FIG. 6 demonstrates that a menu 602 may define audio settings 606 for a video 608. The video 608 may be stored in the database 120 in some aspects, and include an audio track 610 and a video track 612. The audio track 610 may also be provided to the voice detection component 404. The voice detection component 404 sends a signal to the dynamic menuing component 406, indicating whether the audio track 610 includes a voice signal or does not include a voice signal. The dynamic menuing component 406 may be configured to vary the menu 602 based on the signal from the voice detection component 404.

Before playback of the video 608 via an audio/video player 620, the audio track 610 of the video 608 may be processed and modified by an audio filter 625. The audio filter 625 may be included in the video updating component 408 in some aspects. The audio filter 625 may determine which modifications to make to the audio track 610 based on the audio setting 606. For example, if a first menu item included in the menu 602 was selected (resulting in a first audio setting 606), the audio filter 625 may apply a first filter to the audio track 610. If a second menu item included in the menu 602 was selected by a user, the audio filter 625 may apply a second filter to the audio track 610. The video/audio player 620 may then play a resulting audio track generated by the audio filter 625.

Figure 7A:
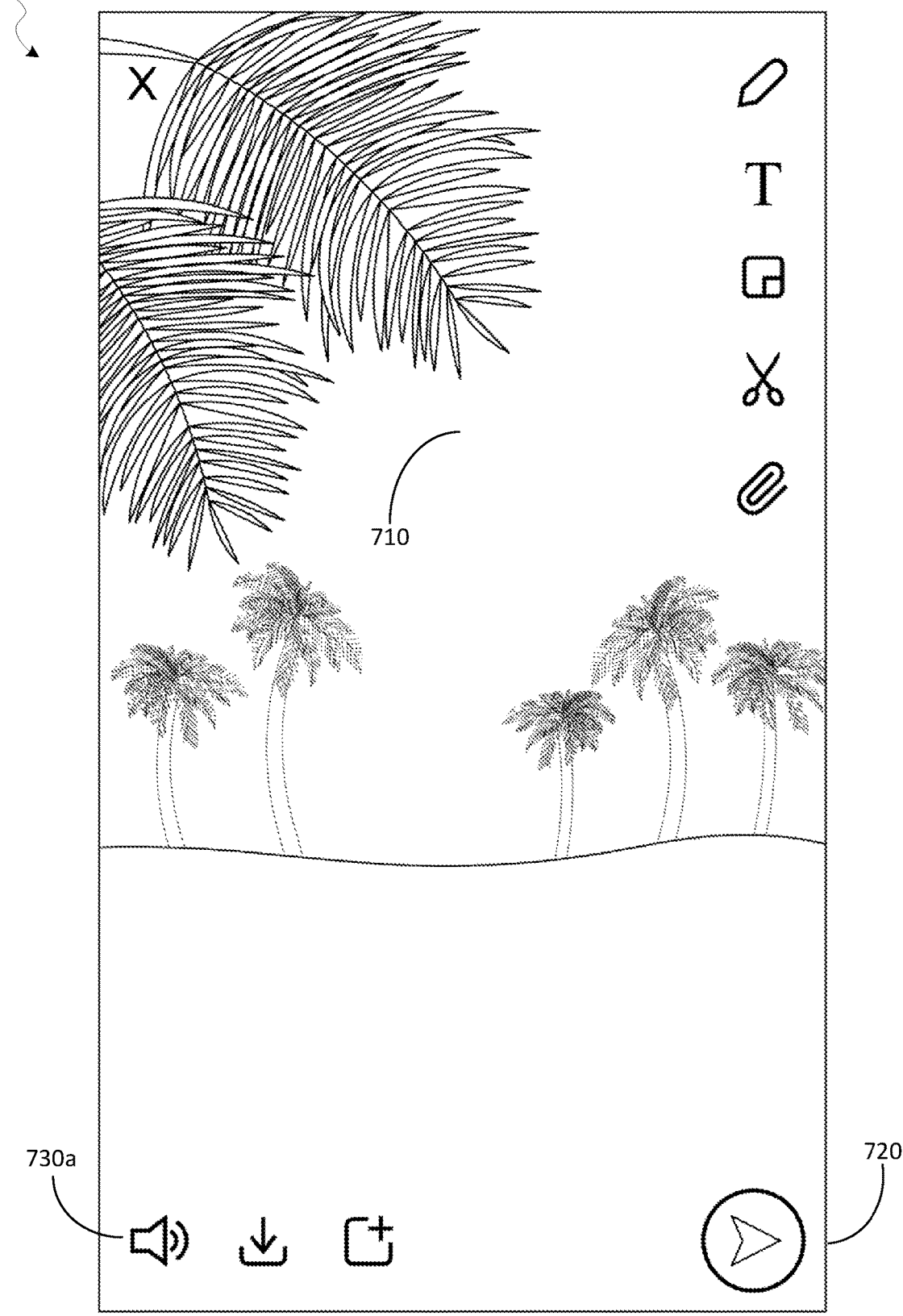
FIGS. 7A, 7B, and 7C are interface diagrams illustrating aspects of user interfaces provided by the messaging system, according to some embodiments.
Figure 7B:
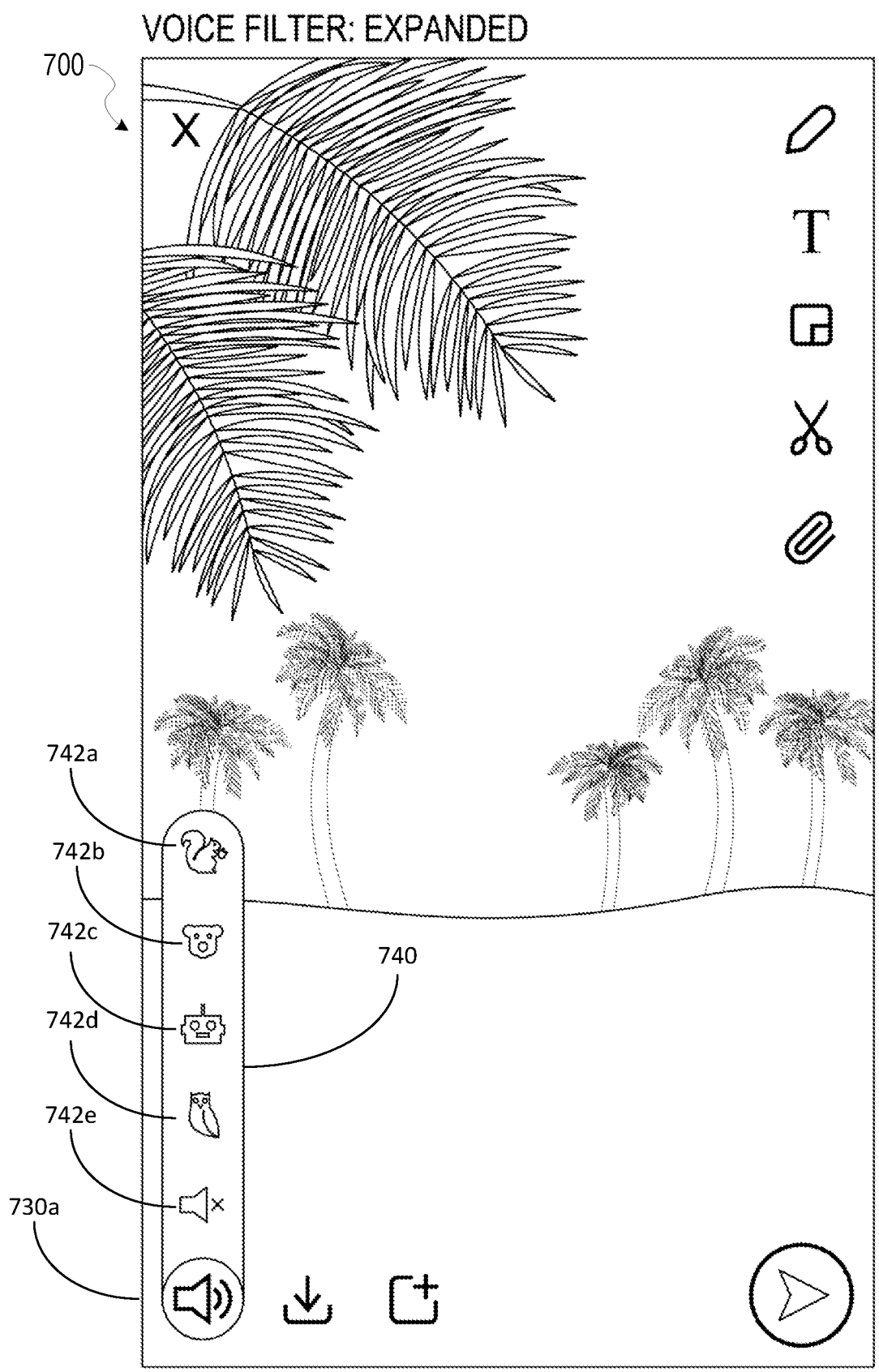
Figure 7C:
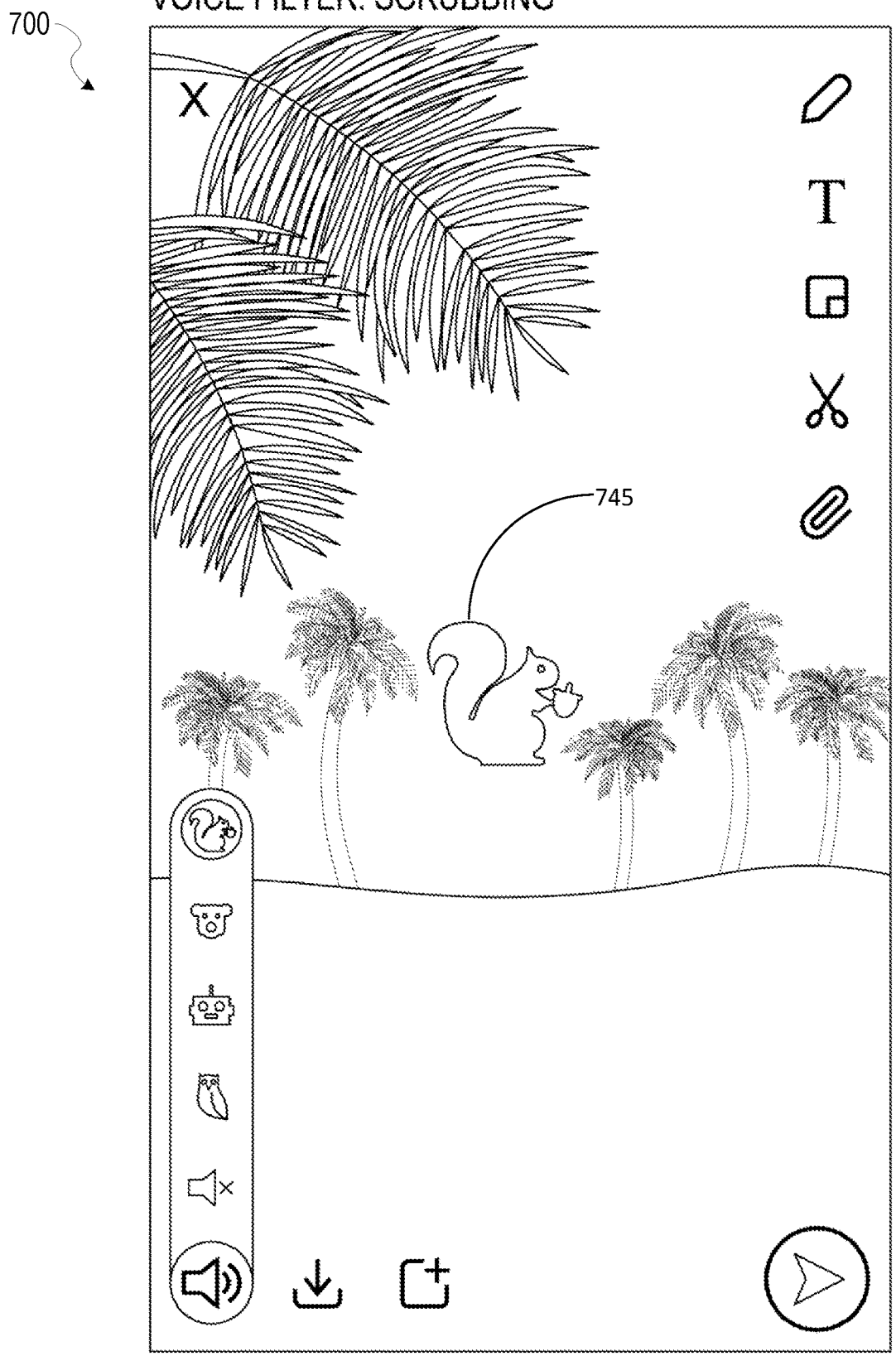

FIGS. 7A-7C are screen shots showing exemplary embodiments of a voice driven dynamic menuing system for video editing. FIG. 7A shows a first view of a video window 700. The video window 700 is shown when a video (e.g. video 502 or video 608) has been loaded. When a video is not being played, a single frame 710 of the video may be displayed in the video window 700. The video window 700 also includes a play icon 720 and an audio menu icon 730a. When selected, the play icon 720 begins playback of the loaded video. Selection of the audio menu icon 730a displays an audio menu, one embodiment of which is shown in FIG. 7B below.

FIG. 7B shows the video window 700 displaying one embodiment of an audio menu 740. The audio menu 740 provides several dynamic menu items 742a-c for editing a voice signal included in an audio track of the video loaded into the video window 700 (such as audio track 506 or 610, discussed above). A first selection 742a may modify a voice signal in the audio track so as to increase a frequency of the voice signal. A second selection 742b may modify the voice signal in the audio track so as to lower the frequency of the voice signal. A third selection 742c may modify the voice signal so as to give the signal a "robotic" sound. A fourth selection 742d modifies the voice signal to provide a variable pitch within the voice signal. A fifth selection 742e may turn off playback of or mute the audio signal.

FIG. 7C is another view of the video window 700. FIG. 7C shows the video window 700 when modifying a voice signal based on a selection of one of the dynamic menu items 742a-e. To indicate the modification of the voice signal is in progress, the video window 700 displays an icon 745. The icon 745 may have a visual appearance similar to that of the selected menu item 742a-e, in the illustrated embodiment, menu item 742a. In some aspects, the icon 745 may be a larger version of an icon for the selected menu item 742a-e, but may otherwise be identical. After the modification of the voice signal is complete, the video window 700 may stop displaying the icon 745.

Figure 8:
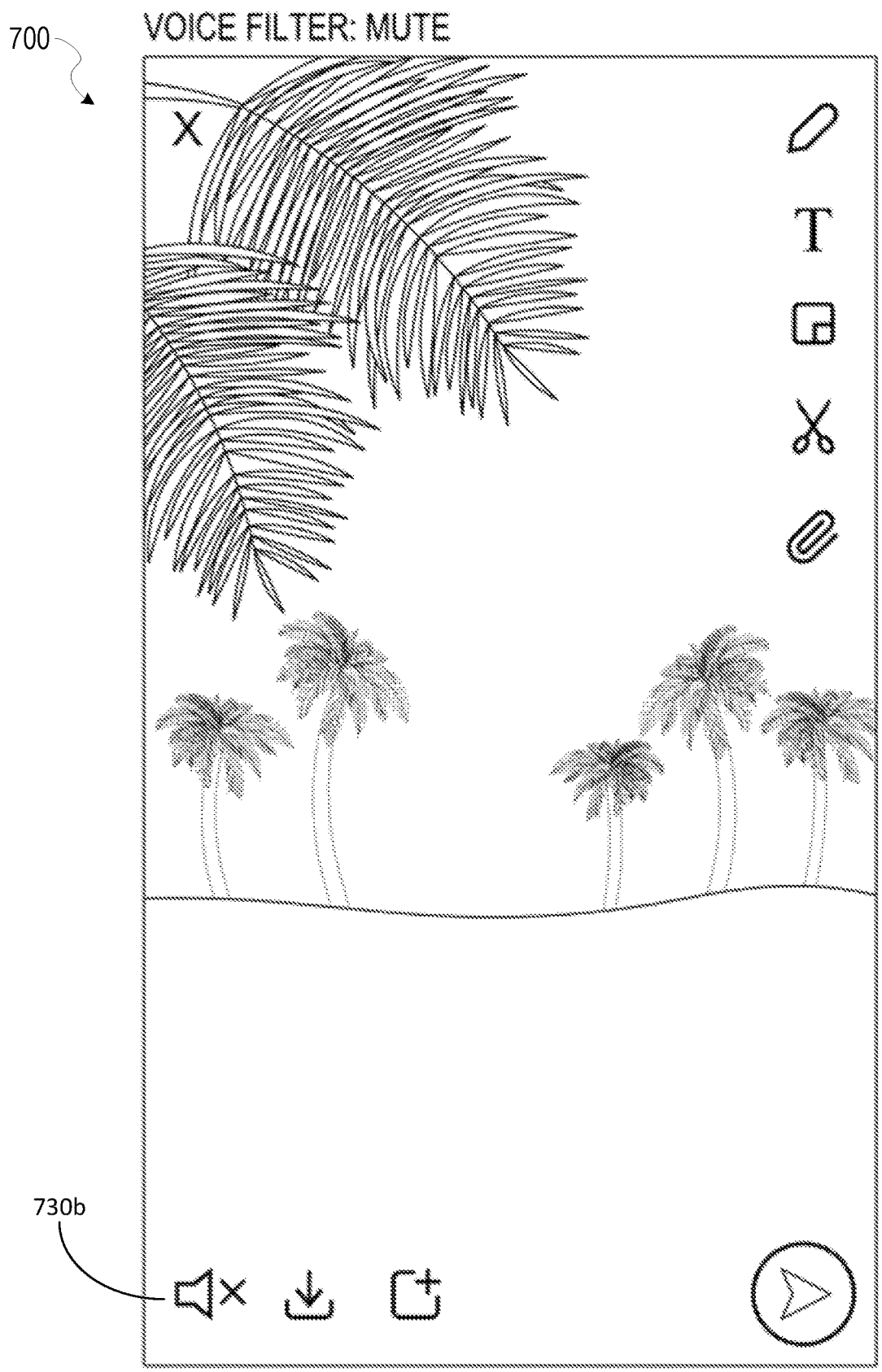
FIG. 8 is an interface diagram illustrating aspects of a user interface provided by the messaging system, according to some embodiments.

FIG. 8 shows another exemplary view of the video window 700. FIG. 8 shows the video window 700 after the dynamic menu item 742e, shown in FIG. 7B, has been selected. After selection of dynamic menu item 742e, the audio menu icon 730b may change in appearance from that of audio menu icon 730a shown in FIGS. 7A-C to that shown in FIG. 8 to indicate the audio track for the video is muted.

Figure 9:
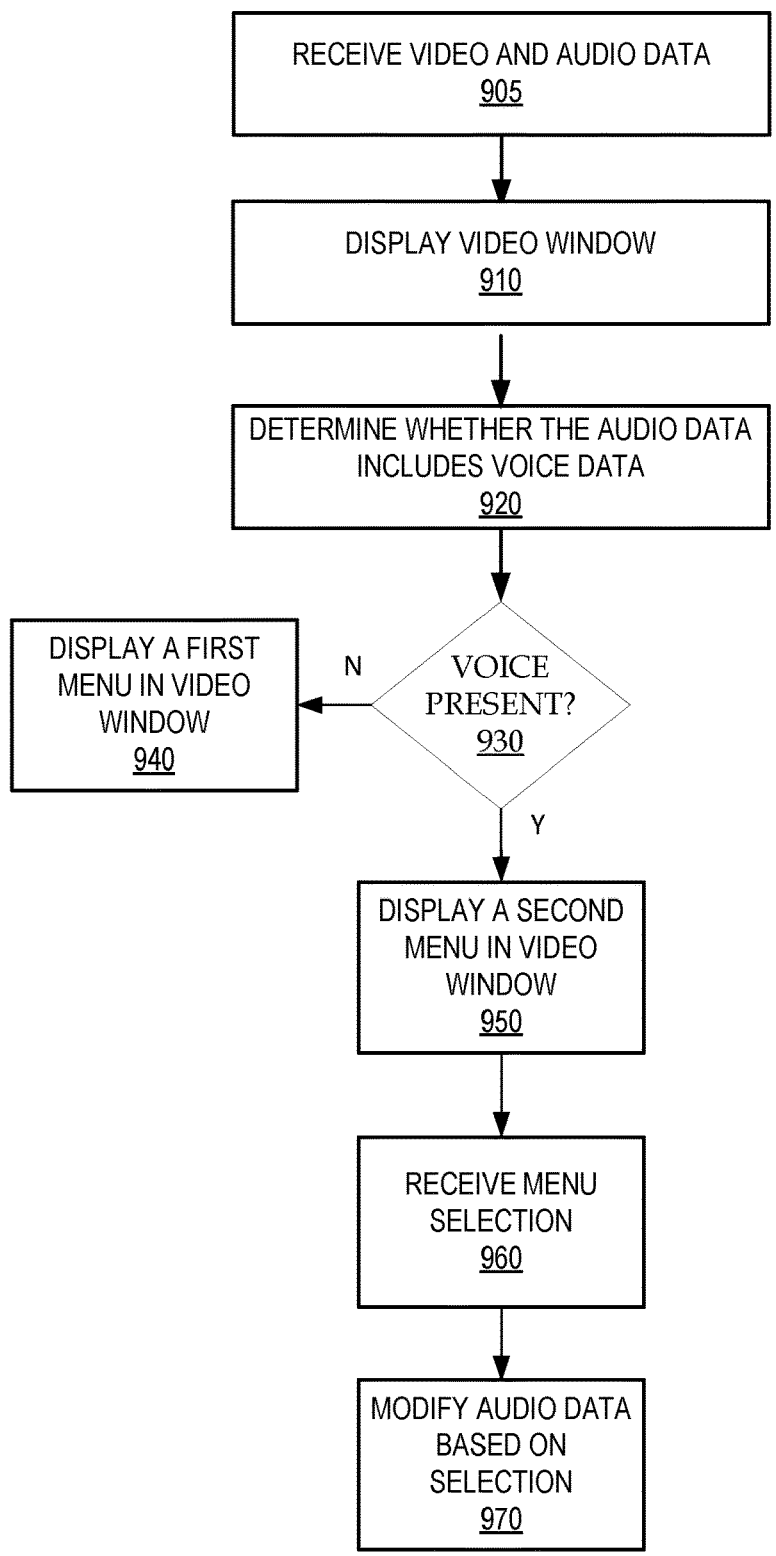
FIG. 9 is a flow chart illustrating operations of the image processing system in performing an example method for video editing, according to some embodiments.

FIG. 9 is a flowchart of an exemplary method of voice driven dynamic menuing. The method 900 may be embodied in computer-readable instructions for execution by one or more processors such that the operations of the method 900 may be performed in part or in whole by the functional components of the video editing system 208; accordingly, the method 900 is described below by way of example with reference thereto. However, it shall be appreciated that at least some of the operations of the method 900 may be deployed on various other hardware configurations and the method 900 is not intended to be limited to the video editing system 208. In some aspects, one or more hardware processors may be configured to perform one or more functions of process 900, discussed below with respect to FIG. 9. For example, the processors 410, which may be equivalent to the processing unit 1054 and/or processor 1104, may be configured, for example by instructions 1004 and/or 1110, to perform one or more of the functions discussed below with respect to FIG. 9.

At operation 905, the video editing system 208 receives video and audio data. In some aspects, the video and audio data may be included in a user generated video file. The file may include a video portion and an audio portion.

At operation 910, a video window is displayed. For example, in some aspects, a video window similar to that of the video window 700 illustrated in FIGS. 7A-C and FIG. 8 may be displayed by operation 910. In some aspects, a single frame of the video data received in block 905 may be displayed in the video window 700.

Operation 920 determines whether the audio data includes a voice signal. In some aspects, operation 920 may include removing background noise from the audio data. In some aspects, operation 920 may determine a signal to noise ratio in one or more frequency bands of the audio data. Thresholds may be applied to one or more of these signal to noise ratios to determine whether the audio data includes a voice signal. In some other aspects, a channel power, voice metrics, and noise power may be determined. Thresholds for the voice metrics may be determined based on an estimated signal to noise ratio.

Decision block 930 determines whether a voice signal was detected in operation 920. If a voice signal was not detected, process 900 moves from block 930 to block 940, where a first menu may be displayed in the video window. In some aspects, the first menu may include the mute menu item 742e, but may not include menu items 742a-d shown in FIG. 7B.

If decision block 930 determines a voice signal is present in the audio data, then process 900 moves to operation 950, where a second menu is displayed in the video window. The second menu may include one or more of dynamic menu items 742a-d. The second menu may also include menu item 742e in some aspects.

In block 960, a selection of an item from the second menu is received. For example, in some aspects, a user of the client messaging application 104 may utilize a pointing device or other input device to select one of the menu items 742a-d (and in some aspects 742e). The selection may be received by process 900.

In block 970, the audio data is modified based on the selection. For example, in the exemplary embodiment shown in FIG. 7B, selection of dynamic menu item 742a may cause block 970 to increase a frequency of the audio data. In some aspects, block 970 may separate the detected voice signal from background noise, and increase the frequency of the voice signal but not of the background noise. The modified voice signal may be recombined with background noise, or may remain separated from the detected background noise.

To continue with the example, if the user selects dynamic menu item 742b, the frequency of the voice signal may be reduced. If the user selects dynamic menu item 742c, the voice signal may be modified to sound more robotic in nature. If the user selects dynamic menu item 742d, the pitch of the voice signal may be varied over a time period. If the user selects dynamic menu item 742e, any video playback performed by the video window 700 may be muted. In some aspects, the modified audio data is written to an output device. For example, in some aspects, the video data and modified audio data may be written to a video file, such as a file conforming to the MPEG-4 specifications. In some other aspects, the modified audio data may be written to a database, such as the database 112 discussed above with respect to at least FIGS. 1 and 3.

Software Architecture

Figure 10:
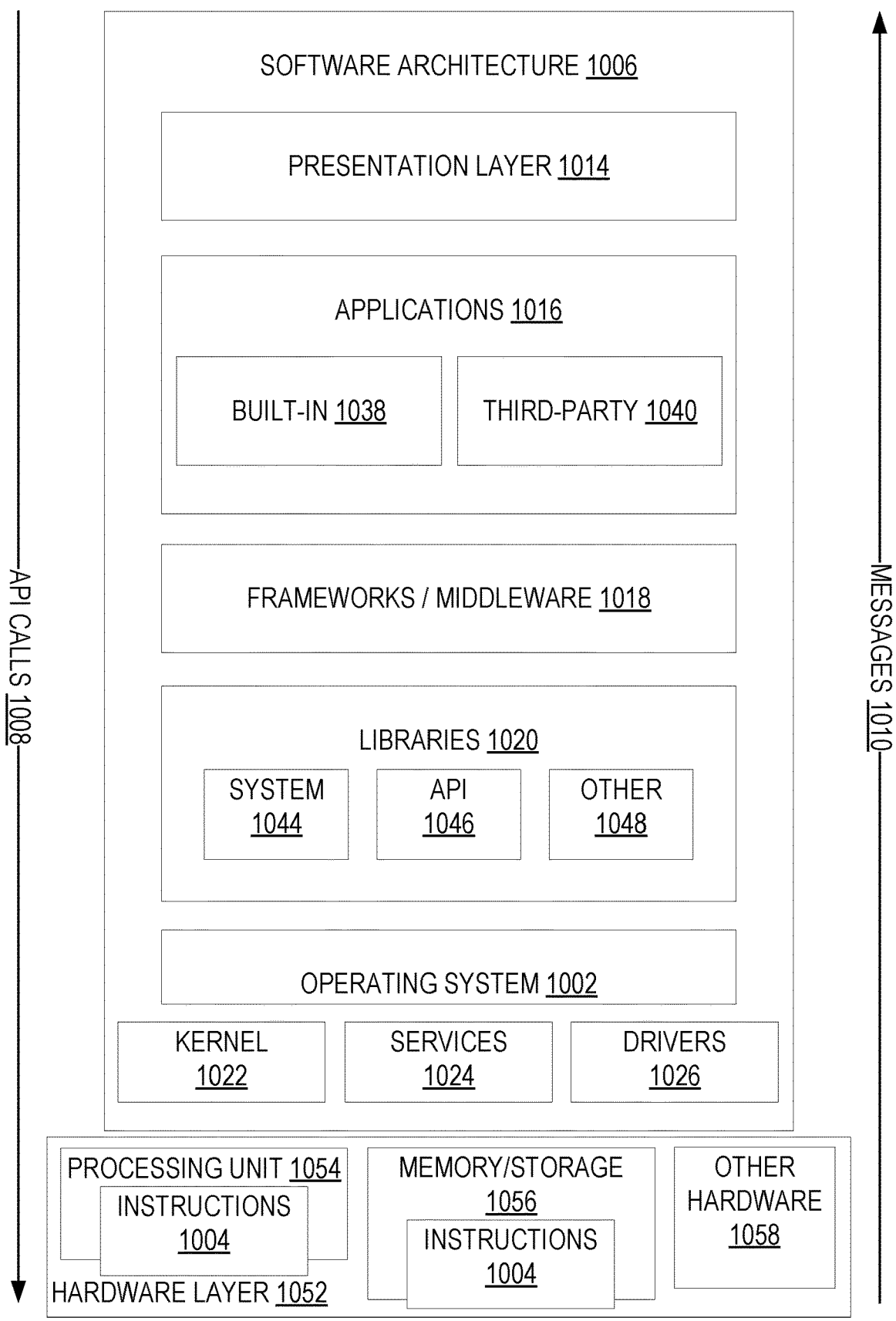
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as a machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage 1056, which also have the executable instructions 1004. The hardware layer 1052 may also comprise other hardware 1058.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response as messages 1010. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Exemplary Machine

Figure 11:
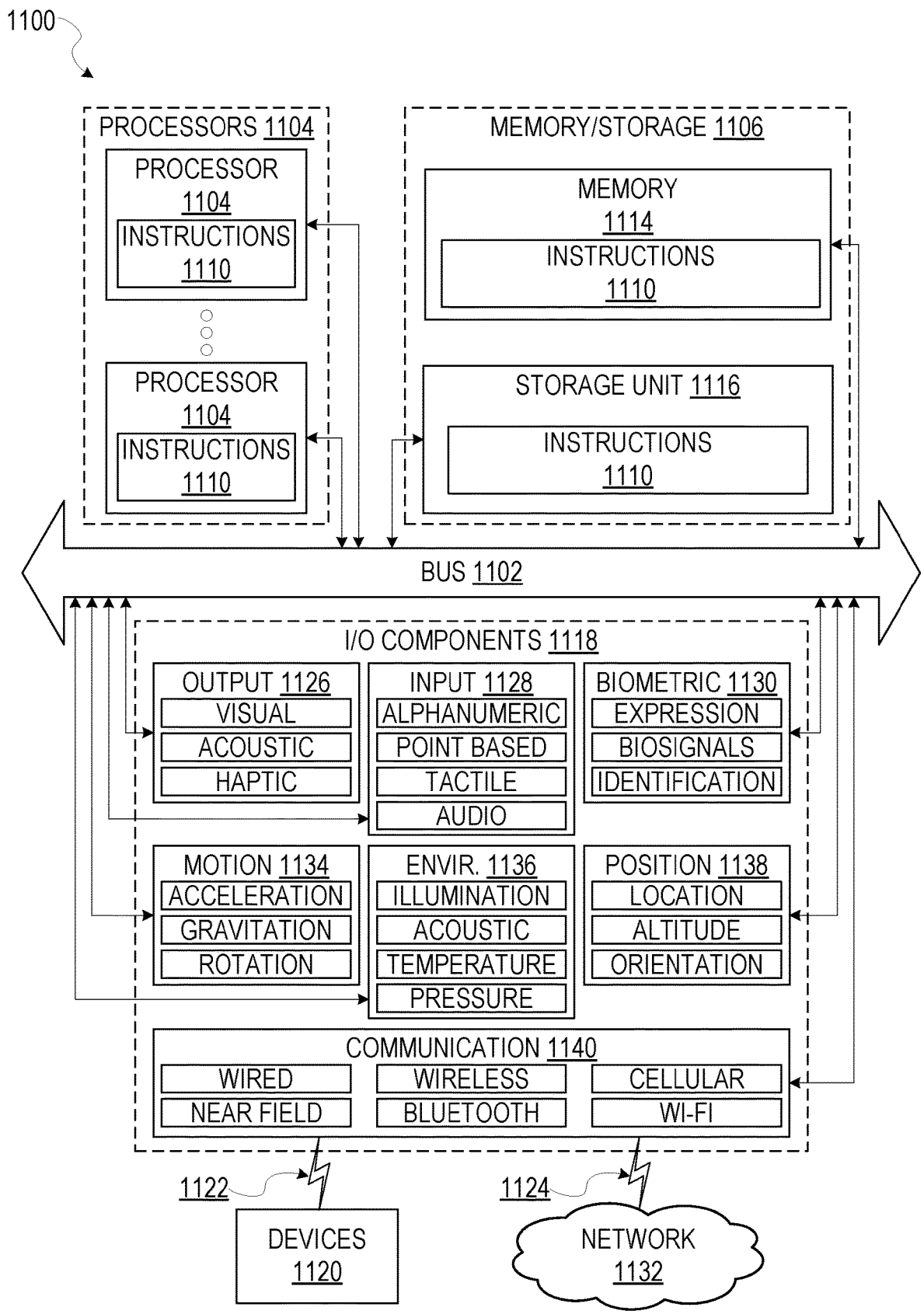
FIG. 11 is a block diagram illustrating components of a machine, according to some exemplary embodiments, able to read instructions from a machine-readable medium (e.g., a machine-readable storage medium) and perform any one or more of the methodologies discussed herein.

FIG. 11 is a block diagram illustrating components (also referred to herein as "modules") of a machine 1100, according to some exemplary embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of the processors 1104 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1118 may include a wide variety of components to provide a user interface for receiving input, providing output, producing output, transmitting information, exchanging information, capturing measurements, and so on. The specific I/O components 1118 that are included in the user interface of a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various exemplary embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1128 may also include one or more image-capturing devices, such as a digital camera for generating digital images and/or video.

In further exemplary embodiments, the I/O components 1118 may include biometric components 1130, motion components 1134, environment components 1136, or position components 1138, as well as a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122 respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAPCHAT, INC., All Rights Reserved.

What is claimed is:

1. A system comprising:
   a hardware processor; and
   hardware memory coupled to the hardware processor and storing instructions that, when executed configure the hardware processor to perform operations comprising:
   displaying, based on determining that an audio track includes a voice signal, an interactive menu that comprises a plurality of voice modification options including a first visual indicator that visually represents a voice modification characteristic associated with a first voice modification option;
   receiving input selecting the first voice modification option from the plurality of voice modification options, the first voice modification option corresponding to the first visual indicator;
   modifying a characteristic of the voice signal separately from one or more other audio components in the audio track based on a voice modification characteristic associated with the selected first voice modification option; and
   in response to receiving input selecting the first voice modification option and modifying the characteristic, adding to a display an enlarged version of the first visual indicator together with modifying the characteristic of the voice signal, the enlarged version of the first visual indicator being displayed together with the first visual indicator.

2. The system of claim 1, the operations further comprising:
retrieving, from a database, a video that includes an audio track; and
determining that the audio track of the video includes the voice signal.

3. The system of claim 1, wherein the operations further comprise:
displaying a video window, wherein the interactive menu is selected from a plurality of menus and the selected interactive menu is displayed in the video window; and
applying an audio filter to audio data of the audio track in response to a first menu selection from the selected interactive menu.

4. The system of claim 3, the operations further comprising:
applying a second audio filter to the audio data in response to a second menu selection from the selected interactive menu.

5. The system of claim 1, wherein the enlarged version of the first visual indicator is automatically removed from being displayed in response to determining that modification of the characteristic of the voice signal is complete.

6. The system of claim 1, wherein a second voice modification option is represented in the interactive menu by a second visual indicator, together with the first visual indicator, that visually represents another voice modification characteristic associated with the second voice modification option.

7. The system of claim 1, wherein the plurality of voice modification options includes at least one of an option to increase a frequency of the voice signal, an option to lower the frequency of the voice signal, an option to alter the voice signal to have robotic sound characteristics, or an option to vary a pitch of the voice signal.

8. The system of claim 1, wherein the operations further comprise:
retrieving a video that includes a second audio track;
determining that that a voice signal is absent from the second audio track of the video by applying a threshold to a signal to noise ratio of one or more frequency bands in the second audio track; and
displaying a menu of a plurality of menus in response to determining that the voice signal is absent from the second audio track of the video.

9. The system of claim 1, wherein the operations further comprise:
displaying a second visual indicator that visually represents a second voice modification characteristic associated with a second voice modification option.

10. A method, comprising:
displaying, based on determining that an audio track includes a voice signal, an interactive menu that comprises a plurality of voice modification options including a first visual indicator that visually represents a voice modification characteristic associated with a first voice modification option;
receiving input selecting the first voice modification option from the plurality of voice modification options, the first voice modification option corresponding to the first visual indicator;
modifying a characteristic of the voice signal separately from one or more other audio components in the audio track based on a voice modification characteristic associated with the selected first voice modification option; and
in response to receiving input selecting the first voice modification option and modifying the characteristic, adding to a display an enlarged version of the first visual indicator together with modifying the characteristic of the voice signal, the enlarged version of the first visual indicator being displayed together with the first visual indicator.

11. The method of claim 10, further comprising:
retrieving, from a database, a video that includes an audio track; and
determining that the audio track of the video includes the voice signal.

12. The method of claim 10, further comprising:
displaying a video window, wherein the interactive menu is selected from a plurality of menus and the selected interactive menu is displayed in the video window; and
applying an audio filter to audio data of the audio track in response to a first menu selection from the selected interactive menu.

13. The method of claim 12, further comprising applying a second audio filter to the audio data in response to a second menu selection from the selected interactive menu.

14. The method of claim 13, wherein the enlarged version of the first visual indicator is automatically removed from being displayed in response to determining that modification of the characteristic of the voice signal is complete.

15. The method of claim 10, wherein a second voice modification option is represented in the interactive menu by a second visual indicator, together with the first visual indicator, that visually represents another voice modification characteristic associated with the second voice modification option.

16. A non-transitory computer readable storage medium comprising instructions that when executed cause a hardware processor to perform operations comprising:
displaying, based on determining that an audio track includes a voice signal, an interactive menu that comprises a plurality of voice modification options including a first visual indicator that visually represents a voice modification characteristic associated with a first voice modification option;
receiving input selecting the first voice modification option from the plurality of voice modification options, the first voice modification option corresponding to the first visual indicator;
modifying a characteristic of the voice signal separately from one or more other audio components in the audio track based on a voice modification characteristic associated with the selected first voice modification option; and
in response to receiving input selecting the first voice modification option and modifying the characteristic, adding to a display an enlarged version of the first visual indicator together with modifying the characteristic of the voice signal, the enlarged version of the first visual indicator being displayed together with the first visual indicator.

17. The non-transitory computer readable medium of claim 16, the operations further comprising:
retrieving, from a database, a video that includes an audio track; and
determining that the audio track of the video includes the voice signal.

18. The non-transitory computer readable medium of claim 16, wherein the operations further comprise:
    displaying a video window, wherein the interactive menu is selected from a plurality of menus and the selected interactive menu is displayed in the video window; and
    applying an audio filter to audio data of the audio track in response to a first menu selection from the selected interactive menu.

19. The non-transitory computer readable medium of claim 18, the operations further comprising:
    applying a second audio filter to the audio data in response to a second menu selection from the selected interactive menu.

20. The non-transitory computer readable medium of claim 16, wherein a second voice modification option is represented in the interactive menu by a second visual indicator, together with the first visual indicator, that visually represents another voice modification characteristic associated with the second voice modification option.

\* \* \* \* \*